(12) United States Patent
Blakely

(10) Patent No.: US 10,630,184 B1
(45) Date of Patent: Apr. 21, 2020

(54) HYSTERETIC-BASED CONTROLLER SYNCHRONIZED BY A SYNTHESIZED VOLTAGE

(71) Applicant: Enovate Medical, LLC, Murfreesboro, TN (US)

(72) Inventor: George Blakely, Murfreesboro, TN (US)

(73) Assignee: Enovate Medical, LLC, Murfreesboro, TN (US)

(*) Notice: Subject to any disclaimer, the term of this patent is extended or adjusted under 35 U.S.C. 154(b) by 0 days.

(21) Appl. No.: 16/129,383

(22) Filed: Sep. 12, 2018

Related U.S. Application Data

(60) Provisional application No. 62/559,329, filed on Sep. 15, 2017.

(51) Int. Cl.
| | |
|---|---|
| *H02M 3/158* | (2006.01) |
| *H02J 1/10* | (2006.01) |
| *H02M 3/157* | (2006.01) |
| *G05F 1/40* | (2006.01) |
| *H02M 1/00* | (2006.01) |

(52) U.S. Cl.
CPC ............ *H02M 3/1588* (2013.01); *G05F 1/40* (2013.01); *H02J 1/102* (2013.01); *H02M 3/157* (2013.01); *H02M 3/1584* (2013.01); *H02M 2001/0025* (2013.01); *H02M 2003/1586* (2013.01)

(58) Field of Classification Search
CPC .. H02M 3/1588; H02M 3/157; H02M 3/1584; H02M 2003/1586; H02M 2001/0025; H02M 2001/0022; H02J 1/102; G05F 1/40
See application file for complete search history.

(56) References Cited

U.S. PATENT DOCUMENTS

| | | | | |
|---|---|---|---|---|
| 2008/0174286 | A1* | 7/2008 | Chu | H02M 3/1588 323/271 |
| 2009/0284994 | A1* | 11/2009 | Lin | H02M 3/335 363/21.13 |
| 2013/0063106 | A1* | 3/2013 | Nishida | H02M 3/156 323/271 |

* cited by examiner

*Primary Examiner* — Kyle J Moody
*Assistant Examiner* — Jye-June Lee
(74) *Attorney, Agent, or Firm* — Waller Lansden Dortch & Davis, LLP; Matthew C. Cox

(57) ABSTRACT

A power controller for an electrical load is disclosed. The power controller includes a power stage operable to selectively provide an output voltage to the load. An input voltage generator supplies an input voltage to the power stage. A hysteretic comparator is operable to compare a reference voltage to a feedback output voltage from the load, the feedback output voltage being at least a portion of the output voltage, and provide a hysteretic comparator output to the power stage which controls the output voltage. A synthesizing circuit is operable to generate a synthesized voltage and couple the synthesized voltage with the feedback output voltage before the feedback output voltage is compared with the reference voltage by the hysteretic comparator. Coupling of the synthesized voltage with the feedback output voltage synchronizes the hysteretic comparator output with the input voltage provided to the power stage.

11 Claims, 9 Drawing Sheets

HYSTERETIC-BASED CONTROLLER SYNCHRONIZED BY A SYNTHESIZED VOLTAGE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a non-provisional of U.S. Patent Application No. 62/559,329 filed Sep. 15, 2017 entitled SYNTHETIC RIPPLE HYSTERETIC CONTROLLER, which is hereby incorporated by reference in its entireties.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to power control topologies in electrical circuits.

Power control topologies are typically designed to regulate an output voltage or current to an electrical system. Power control topologies monitor a feedback output voltage or current from a closed loop system and regulate the power provided to the closed loop system based on the feedback output voltage and/or current. While there are many different control topologies available to close the feedback loop, they may be generally grouped into two types: pulse-width modulation (PWM) or hysteretic.

One conventional PWM power control topology is voltage-mode control. Voltage-mode topologies use an error amplifier to compare feedback output voltage to an internal reference voltage. Voltage-mode topologies have a fairly simple design, are fairly noise immune, and also can employ a clock to control a switching frequency of the circuit which can allow the circuit to be synchronized to an external clock source. However, the main disadvantage of voltage-mode topologies is that the voltage mode control introduces a double pole in the power stage, which can typically have a low frequency. This low frequency limits the loop bandwidth and thus the transient response in the power supply.

Hysteretic control is an extremely simple control topology. A comparator with some small hysteresis between its terminals compares the feedback output voltage of the closed loop system directly to a high-accuracy reference voltage and controls the power gate driver accordingly. The advantage of such a direct control over the output voltage is the speed and transient response of the control loop. When the output voltage changes due to a transient, the reaction time of the control loop to the transient is limited only by the propagation delays in the comparator and power gate driver. There is no low-bandwidth error amplifier for an error signal to travel through.

Thus, the hysteretic topology is a very fast and efficient control topology. Additionally, its simplicity of operation inherently stabilizes the closed loop system without any required loop compensation. This simplicity also helps reduce the cost of the control topology. Hysteretic control topologies typically do not include an oscillator or error amplifier to design, build, and test. A basic hysteretic comparator simply controls the switching action of the power supply. The primary disadvantage of hysteretic control topologies in its fundamental form is the switching frequency variation associated with the hysteretic control topology. The switching frequency of a hysteretic control topology is not set by a clock or synchronization signal. Instead, the switching frequency is set by the hysteresis amount in the control system, as well as the external components and operating conditions of the electrical system. Large frequency variations associated with hysteretic control topologies can make them unsuitable for certain applications such as medical or industrial automation systems which require more controlled or consistent switching frequencies.

What is needed then are improvements in power control topologies.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the current disclosure is a power controller for an electrical load including a power stage operable to selectively provide an output voltage to the load. An input voltage generator supplies an input voltage to the power stage. A hysteretic comparator is operable to compare a reference voltage to a feedback output voltage from the load, the feedback output voltage being at least a portion of the output voltage, and provide a hysteretic comparator output to the power stage which controls the output voltage based on the comparison between the reference voltage and the feedback output voltage. A synthesizing circuit is operable to generate a synthesized voltage and couple the synthesized voltage with the feedback output voltage before the feedback output voltage is compared with the reference voltage by the hysteretic comparator. Coupling of the synthesized voltage with the feedback output voltage synchronizes the hysteretic comparator output with the input voltage provided to the power stage. Synchronization of the hysteretic comparator output with the input voltage can help provide a controlled switching frequency for the power controller.

The operating modes supported by the control topology of the present disclosure can include, but are not limited to, soft start, cycle by cycle current limit, and transition between a discontinuous pulse skip mode and a fixed frequency PWM mode. Various modes can be performed with a hysteretic comparator operating in voltage mode and a synthesized "ripple" voltage generated, phase shifted accordingly, and coupled to the feedback output voltage being fed back to the hysteretic comparator.

Another aspect of the present disclosure is a method of controlling power supply for a load including the steps of providing a power stage operable to provide an output voltage to the load; supplying an input voltage to the power stage; comparing a reference voltage to a feedback output voltage from the load with a hysteretic comparator, the feedback output voltage being at least a portion of the output voltage; providing a hysteretic comparator output to the power stage from the hysteretic comparator to control the output voltage provided by the power stage based on the comparison between the reference voltage and the feedback output voltage; and coupling a synthesized voltage with the feedback output voltage before the feedback output voltage is compared with the reference voltage by the hysteretic comparator, the coupling of the synthesized voltage with the feedback output voltage synchronizing the hysteretic comparator output with the input voltage provided to the power stage.

One objective of the current disclosure is to synchronize the output of a hysteretic comparator with an input voltage supplied to a power stage switch.

Another objective of the current disclosure is to help provide a fast transient response in a power control topology with controlled switching frequency for the power stage.

Numerous other objects, advantages and features of the present disclosure will be readily apparent to those of skill in the art upon a review of the following drawings and description of a preferred embodiment.

DETAILED DESCRIPTION

Figure 1:
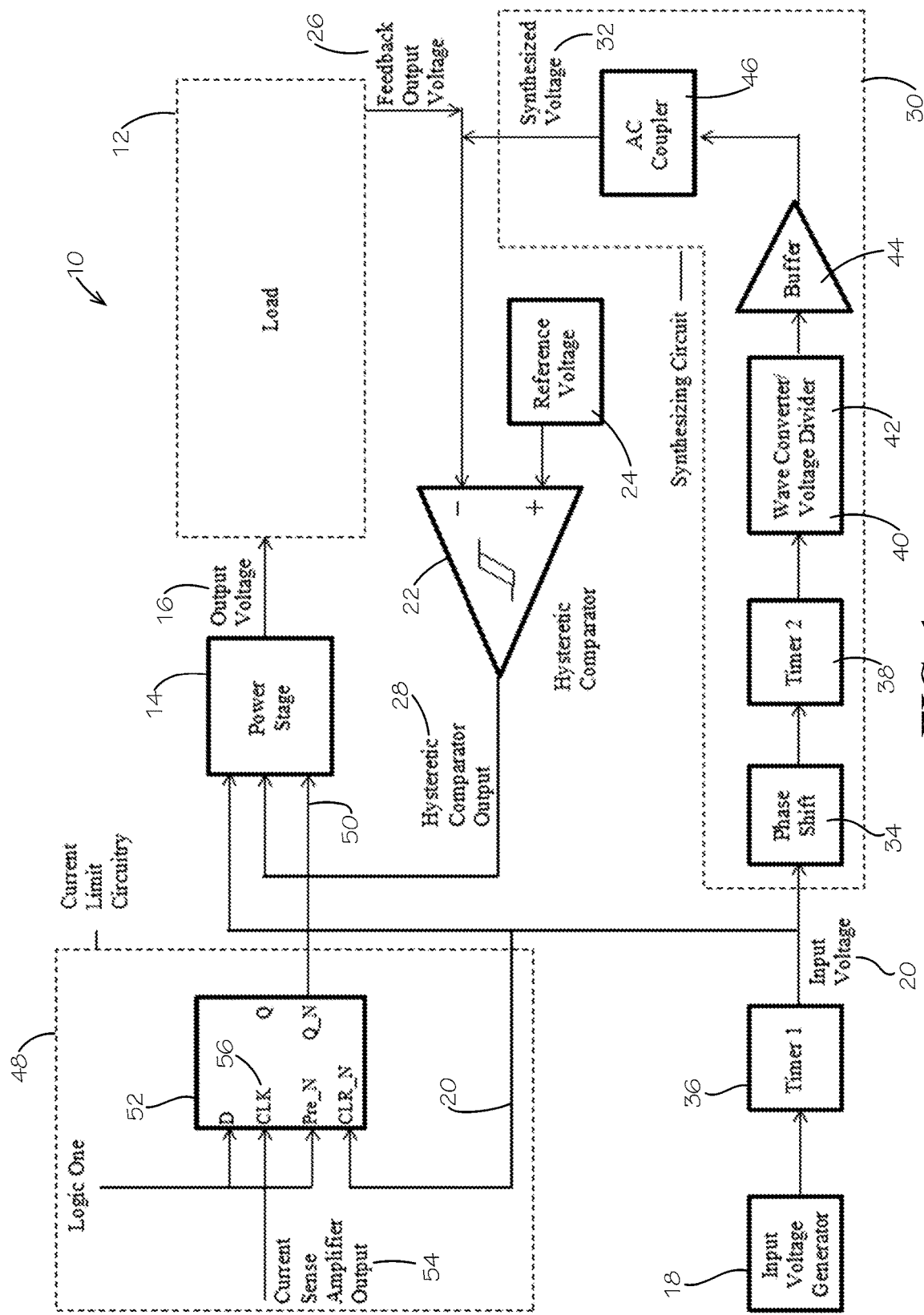
FIG. 1 is a block diagram of one exemplary embodiment of a power controller of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Various embodiments of a power controller 10 for an electrical load 12 are shown in FIGS. 1-5. Power controller 10 can include a power stage 14 operable to selectively provide an output voltage 16 to load 12 for powering load 12. Power stage 14 can include a power stage switch 70 and a power stage voltage source 15 which can be amplified in some embodiments by power stage 14 to produce output voltage 16. An input voltage generator 18 supplies an input voltage 20 to power stage 14, and specifically to power stage switch 70. A hysteretic comparator 22 is operable to compare a reference voltage 24 to a feedback output voltage 26 from load 12, feedback output voltage 26 being at least a portion of output voltage 16, and provide a hysteretic comparator output 28 to power stage 14 which controls output voltage 16 based on the comparison between reference voltage 24 and feedback output voltage 26. A synthesizing circuit 30 is operable to generate a synthesized voltage 32 and couple synthesized voltage 32 with feedback output voltage 26 before feedback output voltage 26 is compared with reference voltage 24 by hysteretic comparator 22. Coupling of synthesized voltage 32 with feedback output voltage 26 synchronizes hysteretic comparator output 28 with input voltage 20 provided to power stage 14.

Having the feedback output voltage 26 from power stage 14 and load 12 along with synthesized voltage 32 present at the negative terminal of hysteretic comparator 22 can potentially cause false triggering resulting in the malfunction of power converter 10 unless hysteretic comparator output 28 is synchronized with input voltage 20. Power stage 14 can include an AND function power switch which can receive input voltage 20 and hysteretic comparator output 28. The AND function power switch of power stage 14 can be configured to allow power stage 14 to provide output voltage 16 to load 12 when input voltage 20 and hysteretic comparator output 28 both reach a "logic one" status at the AND function power switch of power stage 14. When hysteretic comparator output 28 is synchronized with input voltage 20, within a given period of input voltage 20, input voltage 20 will reach a "logic one" status at power stage 14 before hysteretic comparator output 28 reaches a "logic one" status at power stage 14. Hysteretic comparator output 28 will subsequently reach a "logic zero" status within the given period of input voltage 20 before input voltage 20 reaches a "logic zero" status at power stage 14 and power stage switch 70. "Logic one" and "logic zero" can denote a given voltage being above or below a threshold voltage, respectively. Voltages above the threshold voltage are associated with an "on" state, and voltages below the threshold voltage are associated with an "off" state.

The result is that the input voltage 20 acts as an enabling "window" for power converter 10. It also sets a maximum "on" time in the event hysteretic comparator output 28 stays "on" longer than input voltage 20. However, since hysteretic comparator output 28 reaches a "logic one" after input voltage 20 but reaches a "logic zero" before input voltage 20 in a given period of input voltage 20, the actual power switch control of power controller 10 is driven by hysteretic comparator 22 and hysteretic comparator output 28. Regardless what the state of the other inputs to the AND function are, the maximum "on" time of power stage 14 will be the same as the duty cycle of input voltage 20. This function is useful for power converter topologies that require a maximum duty cycle control.

Power controller 10 can include a first timer 36 driven by input voltage generator 18. First timer 36 can be configured to control the frequency and duty cycle of input voltage 20, such that input voltage 20 can be supplied to power stage 14 at a desired frequency and duty cycle. In some embodiments, input voltage generator 18 and first timer 36 can be operable to also supply input voltage 20 to synthesizing circuit 30, and synthesizing circuit 30 can be operable to manipulate input voltage 20 to generate synthesized voltage 32. Synthesizing circuit 30 can include phase shift circuitry 34 operable to produce a phase shift in input voltage 20 such that synthesized voltage 32 is phase shifted from input voltage 20. Phase shifting input voltage 20 to generate synthesized voltage 32 can help synchronize hysteretic control output 28 with input voltage 20 once synthetic voltage 32 is coupled with feedback output voltage 26.

The phase shifted input voltage 20 can then become the input to a second timer 38. Second timer 38 can maintain synthesized voltage 32 at a desired frequency and a second duty cycle. In some embodiments, second timer 38 can maintain synthesized voltage 32 at the same frequency as input voltage 20, and the second duty cycle can be different than the first duty cycle associated with input voltage 20. In some embodiments, the second duty cycle associated with synthesized voltage 32 can be less than the first duty cycle associated with input voltage 20. In some embodiments, second timer 38 can be operable to maintain synthesized voltage 32 at a duty cycle of about 50 percent. In some embodiments, the first duty cycle of input voltage 20 set by first timer 36 can be gradually increased during a start-up process to produce a "soft start" function. The second duty cycle of synthesized voltage 32 can also be gradually increased proportionally to the first duty cycle during the "soft start" function to maintain synchronization of hysteretic comparator output 28 and input voltage 20. In some embodiments, first and second timers 36 and 38 can each be one shot timers.

In some embodiments, input voltage generator 18 and first timer 36 can be operable to produce input voltage 20 having a rectangular waveform. Synthesizing circuit 30 of power controller 10 can include a wave converter 40 operable to convert the rectangular waveform of input voltage 20 to a triangular waveform in order to generate a synthesized voltage 32 having a triangular waveform. In some embodiments, an input voltage 20 having a rectangular waveform can be converted by wave converter 40 into a generally symmetric triangular waveform. A generally symmetric triangular waveform can also be considered an isosceles triangular waveform or a waveform wherein each triangle has opposing sides of substantially equal lengths. In other embodiments, wave converter 40 can be configured to produce an asymmetric triangular waveform, such as a saw-tooth waveform forming substantially right triangular patterns.

Synthesizing circuit 30 can also include a voltage divider 42 and a buffer 44. Once phase shifted input voltage 20 is converted to a triangular waveform by wave convertor 40, voltage divider 42 can be operable to reduce input voltage 20 to generate synthesized voltage 32 having a reduced voltage compared to input voltage 20. Buffer 44 can help reduce interference from feedback output voltage 26 on synthesized voltage 32. Lastly, synthesizing circuit 30 can include a coupler 46 which can couple synthesized voltage 32 with feedback output voltage 26 before or as feedback output voltage 26 is being fed to hysteretic comparator 22. In some embodiments, coupler 46 can be an AC coupler configured to filter out any DC components in feedback output voltage 26 or synthesized voltage 32. Feedback resistors of power stage 14, AC coupler 46, and the low output impedance of buffer 44 creates an RC network that attenuates the feedback output voltage 26 generated by the equivalent series inductance (ESR) of an output capacitor 69 receiving output voltage 16 but passes with minimum attenuation the synthesized voltage 32 generated by synthesizing circuit 30.

Thus, synthesizing circuit 30 can be designed in each application to produce a synthesized voltage 32 with a desired phase shift and duty cycle such that when synthesized voltage 32 and feedback output voltage 26 are coupled and provided to hysteretic comparator 22, hysteretic comparator output 28 can be synchronized with an input voltage 20 of power controller 10. The specific amounts of phase shift and duty cycle produced by synthesizing circuit 30 can vary with the specific input voltage 20 desired for a power controller 10 in a given application.

During very light loads or for a power controller 10 with higher output voltage 16 produced by power stage 14, power controller 10 can operate in a discontinuous mode wherein an output capacitor 69 which receives output voltage 16, and from which load 12 can draw power, can become fully charged prior to the start of the next cycle or period of output voltage 16. When an output capacitor 69 becomes fully charged, the inductor current in the system can approach zero. The result is that output voltage 16 attempts to rise. Hysteretic comparator 22 can sense this change in output voltage 16 and responds by setting hysteretic comparator output 28 to a "logic zero" to skip a power cycle of power stage 14. Hysteretic comparator 22 can periodically set its output to a "logic one" to recharge output capacitor 69 in response to sensing in a subsequent cycle that output capacitor 69 has not become fully charged, or that the inductor current is not approaching zero and the output voltage 16 has returned to a predetermined value.

How often hysteretic comparator 22 sets hysteretic comparator output 28 to "logic one" to recharge output capacitor 69 depends on the size of output voltage 16 generated by power stage 14 and the size of load 12 drawing voltage from output capacitor 69. Under these conditions, power controller 10 operates in a discontinuous pulse skip mode. During this discontinuous pulse skip mode the frequency of output voltage 16 generated by power stage 14 varies with load size. However, since hysteretic comparator output 28 spends considerable time in the "logic zero" or "off" state compared to the continuous PWM mode, power controller 10 is able to achieve high efficiency during light loads, as opposed to providing unneeded voltage to a fully charged output capacitor 69.

As output load 12 increases, the refresh or recharge rate of output capacitor 69, or the frequency at which hysteretic comparator output 28 is set to "logic one", also increases until the power controller 10 reaches the continuous pulse width modulation mode of operation. During this mode, the inductor current does not reach zero before the start of the next cycle or period of output voltage 16, and hysteretic comparator output 28 is not set to "logic zero" such that hysteretic comparator output 28 oscillates at the same frequency as input voltage 20 and is synchronized with input voltage 20. Hysteretic comparator 22 can in some embodiments vary its duty cycle to maintain a constant output voltage 16 of power stage 14 in continuous pulse width modulation mode.

In some embodiments, power controller 10 can include circuit limit circuitry 48 operable to provide a current limit circuitry output 50 to power stage 14. Power stage 14 can provide an output current as well as an output voltage 16 to load 12. Current limit circuitry 48 can be configured to determine whether a feedback output current of the system exceeds a predetermined peak current, the feedback output current being at least a portion of the output current. Current limit circuitry 48 can be configured to set the current limit circuitry output 50 to "logic zero" to override the hysteretic comparator output controlling the power stage and prevent the power stage from providing the output voltage to the load when current limit circuitry 48 determines that feedback output current exceeds the peak current. Cycle by cycle current limit is thus easily implemented by current limit circuitry 48.

In some embodiments, current limit circuitry 48 can include a D-type latch 52 operable to provide current limit circuitry output 50 to an AND function power switch 70 of power stage 14. Current limit circuitry 48 can also include a current sense amplifier 68 operable to determine whether a feedback output current exceeds a predetermined peak current. A current sense amplifier output 54 is connected to a clock input 56 of D-type latch 52. If a peak current is sensed by current sense amplifier 68, current sense amplifier output 54 sets current limit circuitry output 50 provided to power stage 14 from the Q_N pin of D-type latch 52 to a "logic zero," effectively overriding the control signal of the hysteretic comparator 22 resulting in the early termination of power stage 14. When input voltage 20 provided to D-type latch 52 reaches a "logic zero", D-type latch 52 is reset and ready for another cycle. If current sense amplifier 68 continues to sense a predetermined peak current, the cycle repeats indefinitely until current sense amplifier 68 no longer detects a set maximum peak current, wherein power controller 10 returns to normal operation.

Thus, power controller 10 can achieve a soft start function, a cycle by cycle current limit function, maximum duty cycle control, and can alternate freely between a continuous PWM mode and a discontinuous pulse skip mode.

Power controller 10 can help provide the benefits of conventional hysteretic control topologies, including low transient response times and low costs, as no error amplifiers are required, and thus no additional compensation components are required in the feedback circuit to overcome the low bandwidth issues associated with such error amplifiers. The only compensation components in the feedback circuit of power controller 10 are the RC network formed by the feedback resistors of the load 12 and the AC coupler 46, which are utilized to suppress the DC components of feedback output voltage 26 or output capacitor 69 ESR ripple and to pass with minimum attenuation synthesized voltage 32 to the negative terminal of the hysteretic comparator 22 in order to achieve synchronization with input voltage 20. The synchronization of hysteretic comparator output 28 and input voltage 20 via synthesized voltage 32 provides a control function for the switching frequency of hysteretic comparator output 28, and thus power stage 14, similar to the switching frequency control functionality typically associated with voltage mode control topologies.

While the design of power controller 10 can be incorporated into an integrated circuit form, it can also be easily implemented with discrete components while still remaining cost effective. FIGS. 2-5 demonstrate exemplary embodiments of practical realizations of a power controller 10 of the present disclosure with discrete components in a boost converter design. The designs of FIGS. 2-5 take an input of 9-15V DC and convert it to a 45V DC output at a maximum of 300 Watt.

Specific circuit components utilized in the embodiments shown in FIGS. 2-5 will be further described by specific model number and/or manufacturer name. The specific circuit components discussed below are not meant to limit the scope of the present disclosure or imply that any particular structure or functionality embodied in the specific circuit components described below is required for the circuit components of power controller 10, more generally described and claimed herein, for which the specific circuit components discussed below are utilized. The specific circuit components discussed below are simply used to describe exemplary embodiments of a power controller 10 of the present disclosure.

Industry standard TLC556C dual CMOS timers can be used for first timer 36 and second timer 38. Industry standard LM393 dual general purpose comparators 58 can be used in phase shift circuitry 34 to implement the phase shift to input voltage 20. A 24 MHz opamp 60, resistor 62, resistor 64, and capacitor 66 can be used to form the rectangle to triangle wave converter 40, voltage divider 42, and buffer or buffer amplifier 44 components of synthesizing circuit 30. AC coupling to the negative terminal of hysteretic comparator 22 can be accomplished with capacitor 67. STMicroelectronics™ rail to rail dual comparators can be used to implement hysteretic comparator 22 and current sense amplifier 68. Texas Instruments™ 74LVC1G11 3 input CMOS gate can be used to implement the "AND" function power switch 70 of power stage 14. Texas Instruments™ SN74HC74 dual D-type latch can be used as D-type latch 52 of the cycle by cycle current limit circuitry 48.

Sample calculations for the embodiments of power controller 10 shown in FIGS. 2-5 are provided herein. Specific values for various components are discussed to show sample calculations for one embodiment of a power controller 10 of the present disclosure. However, one of skill in the art can vary the specific values for the components of power controller 10 discussed for FIGS. 2-5 depending on the specific application and the desired voltage outputs, current outputs, duty cycles, etc. for a given system. The gain of power stage 14 in continuous mode is defined as (Vout/Vin)=1/(1−D), where D is the duty cycle of the clock associated with first timer 36 driving power stage switch 70. The voltage source 15 (Vin) of power stage 14 can be varied between 9V-15V, and power stage 14 can include a power amplifier circuit 17 configured to amplify voltage source 15 of power stage 14 to produce output voltage 16 (Vout) and regulate output voltage 16 at a desired value in this application of about 45V. With power stage voltage source 15 set to 9V, the required gain works out to be (45V/9V)=5 and D=1−(1/5)=0.8 or 80% duty cycle. This is the approximate duty cycle of input voltage 20 from first timer 36 since in reality it will be a bit greater due to losses throughout power stage 14.

The "on" time of the first timer 36 is set by resistor 72 and capacitor 74. With resistor 72 having a value of 1.1K ohm and capacitor 74 having a capacitance of 6800 pF, the "on" time for first timer (T_1) is calculated as T_1=1.1*1.1K*6800 pF=8.23 uS. The period of input voltage 20 generated by input voltage generator 18 can be 10 uS. The resulting duty cycle of first timer 36 and input voltage 20 is (8.23 uS/10 uS)*100=82.3%. The "on" time of the second timer 38 is set by resistor 76 plus resistor 78 and capacitor 80. With resistor 76 having a value of 287 ohm, resistor 78 having a value of 1.1K ohm, and capacitor 80 having a capacitance of 3300 pF, the "on" time for second timer 38 (T_2) is calculated as T_2=1.1*(1.1K+287)*3300 pF=5.03 uS. The resulting duty cycle of second timer 38 is (5.03 uS/10 uS)*100=50.3%.

The output of the second timer 38 is thus a 50% duty cycle square wave with amplitude of 5V pk-pk. It is applied to the RC network formed by resistor 62, resistor 64, and capacitor 66 of wave converter 40. With resistor 62 having a resistance of 51.1 k ohm, resistor 64 having a resistance of 1.47K ohm, and capacitor 66 having a capacitance of 3300 pF, the transfer function of this network is (Z2/Z1), in where Z1=51.1K (resistor 62), and Z2=the parallel combination of XC66=(1/(2*pi*100 KHz*3300 pF)<−90) and R64=1.47K. Z2 works out to be (458.3<−71.84) and the transfer ratio is thus (458.3<−71.84)/51.1K=(0.008969<−71.84). With a signal amplitude of 5V pk-pk coming out of second timer 38, the output amplitude of synthesized voltage 32 from voltage divider 42 is (5V pk-pk*(0.008969<−71.84))= (0.045<−71.84). Thus, the output amplitude of a synthesized voltage 32 coming out of wave converter 40 and voltage divider 42 has a magnitude of 45 mV pk-pk with a triangular waveform. This signal is then buffered by buffer opamp 60 and AC coupled via capacitor 67 to the negative terminal of hysteretic comparator 22. Synthesized voltage 32 is then used to synchronize hysteretic comparator 22 with first timer 36 and input voltage 20 provided to power stage 14.

With resistor 82 having a resistance of 1.1K ohm and resistor 84 having a resistance of 18.7K ohm, and a reference voltage of 2.5 V, output voltage 16 of power stage 14 can be calculated as follows: Vout=(Vref*(R82+R84))/R82, such that Vout=(2.5V*(1.1K+18.7K))/1.1K=45V. There is a small amount of hysteresis set by resistors 86, 88, and 90 in hysteretic comparator 22. The hysteresis is primarily needed to prevent false triggering due to noise pick-up on synthesized voltage 32. With resistors 86 and 88 each having a resistance of 845 ohm, resistor 90 having a resistance of 100K ohm, and a hysteretic comparator output 28 (Vout_comp) of approximately 5V, the amount of hysteresis (V-hyst) is given by V_hyst=(Vout_comp*(R86||R88))/((R86||R88)+R90), where, (R88||R90)=422.5. V_hyst=(5V 422.5)/(422.5+100K)=21.04 mV.

Maximum power stage/switch current (1_pwr_switch_max) can be driven by the voltage supply (Vsupply) to power stage 14, and resistors 92, 94, and 96, which can have resistances of 1.1K, 51.1K, and 0.002 ohm respectively. The maximum power stage/switch current is given by 1_pwr_switch_max=[(Vsupply*R92)/(R94+R92)]/R96, such that 1_pwr_switch_max=[(5V*1K)/(51.1K+1 K)]/0.002=48 A.

The phase shift function can be handled by dual general purpose comparators 58. Comparator 58B can have external hysteresis (58B_hyst) provided by resistors 100, 102, and 104, wherein R100=100K ohm, and R102=R104=43K ohm. 58B_hyst=(5V*(43K||43K))/((43K||43K)+100K)=885 mV. This hysteresis amount provides noise free switching for comparator 58B. There is overall hysteresis from the output of 58B to the input of 58A provided by resistors 106, 108, and 110, wherein R106=100K ohm, and R108=R110=43K ohm. The hysteresis amount works out to be the same as for 58B=885 mV. Delay from the input of 58A to the output of 58B is primarily a function of resistors 112 and 114, wherein R112=42.2K ohm, R114=100K ohm, and capacitors 116 and 118, wherein C116=8 pF and C118=47 pF. By adjusting this RC time constant, a phase shifting effect can be obtained. The actual value for this RC time constant was adjusted via simulation to provide synchronization between hysteretic comparator 22 and first timer 36 via synthesized voltage 32 for power controller 10 of FIG. 2.

Since this is a true hysteretic control method, there is no need for expensive compensation components associated with voltage mode control topologies. Power stage 14 component selections can focus on the power handling capability of the semiconductor devices of power stage 14, wherein the output inductors can be chosen for a desired output current, and output capacitors 69 can be chosen for a desired output voltage 16.

Figure 2:
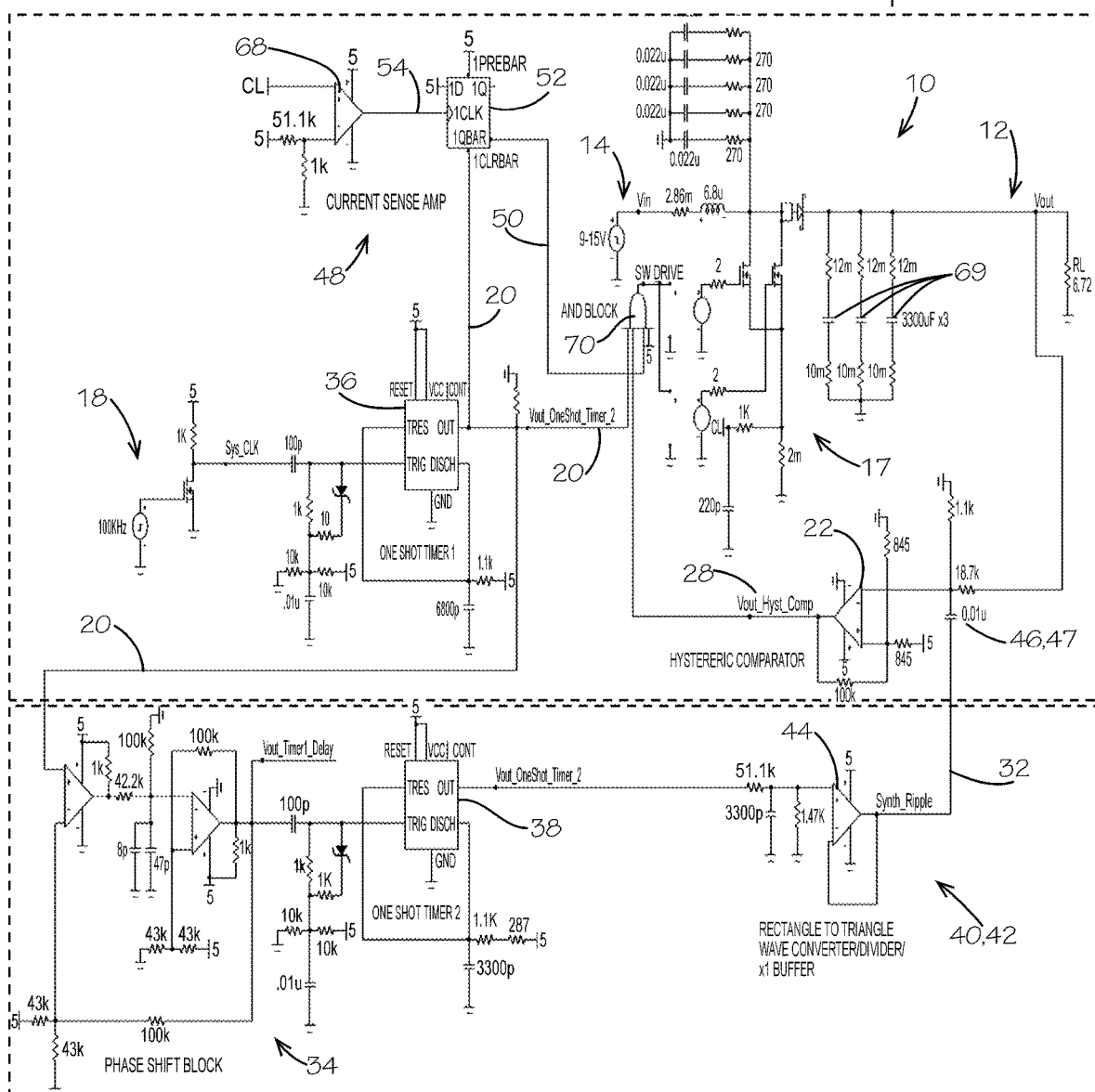
FIG. 2 is a circuit diagram of one embodiment of a practical implementation of the power controller of the present disclosure.
Figure 3:
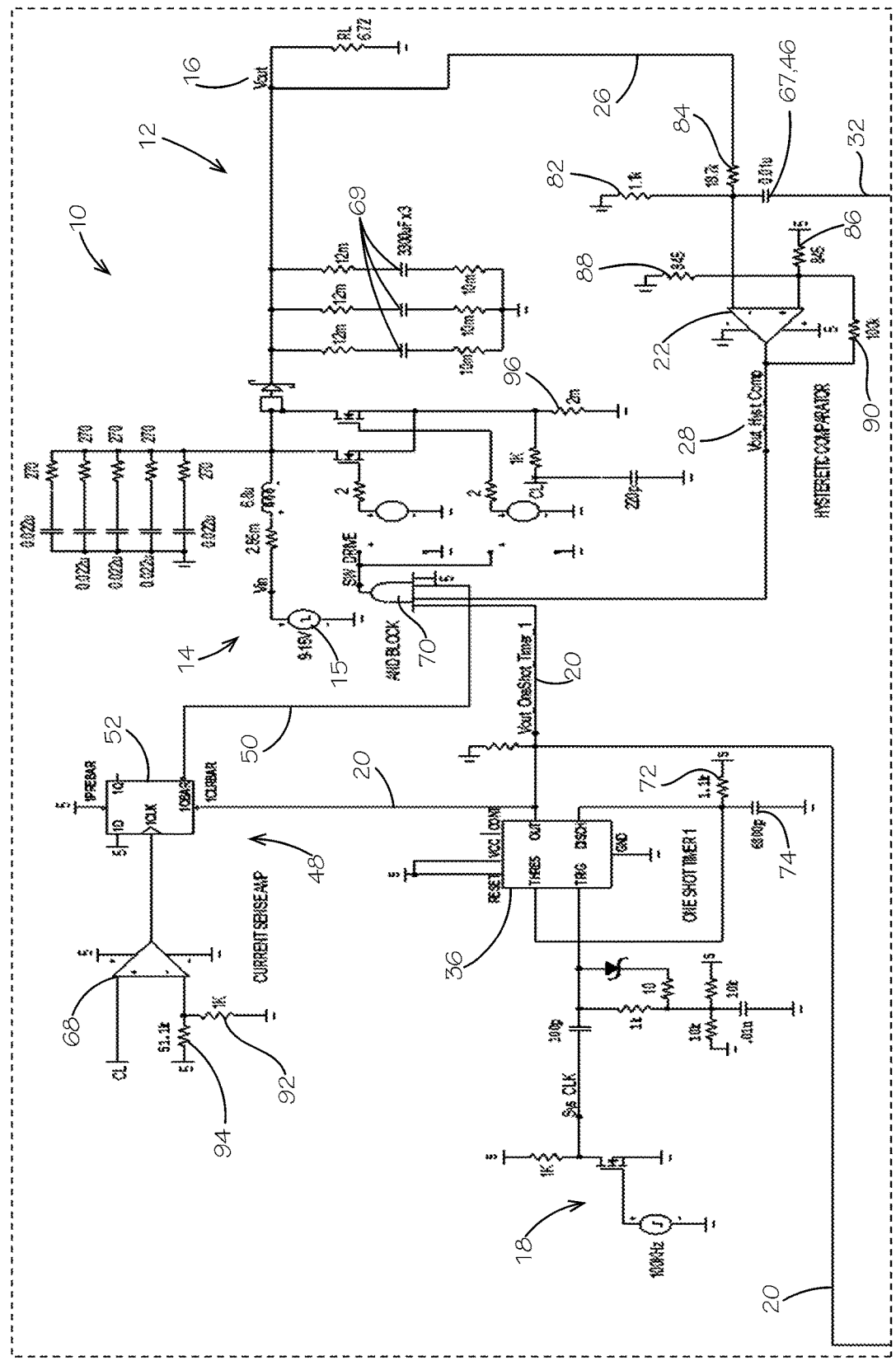
FIG. 3 is a detailed circuit diagram of a first portion of the circuit diagram of FIG. 2 showing the circuitry for a power stage, a hysteretic comparator, an input voltage generator, and a first timer of the power controller.
Figure 4:
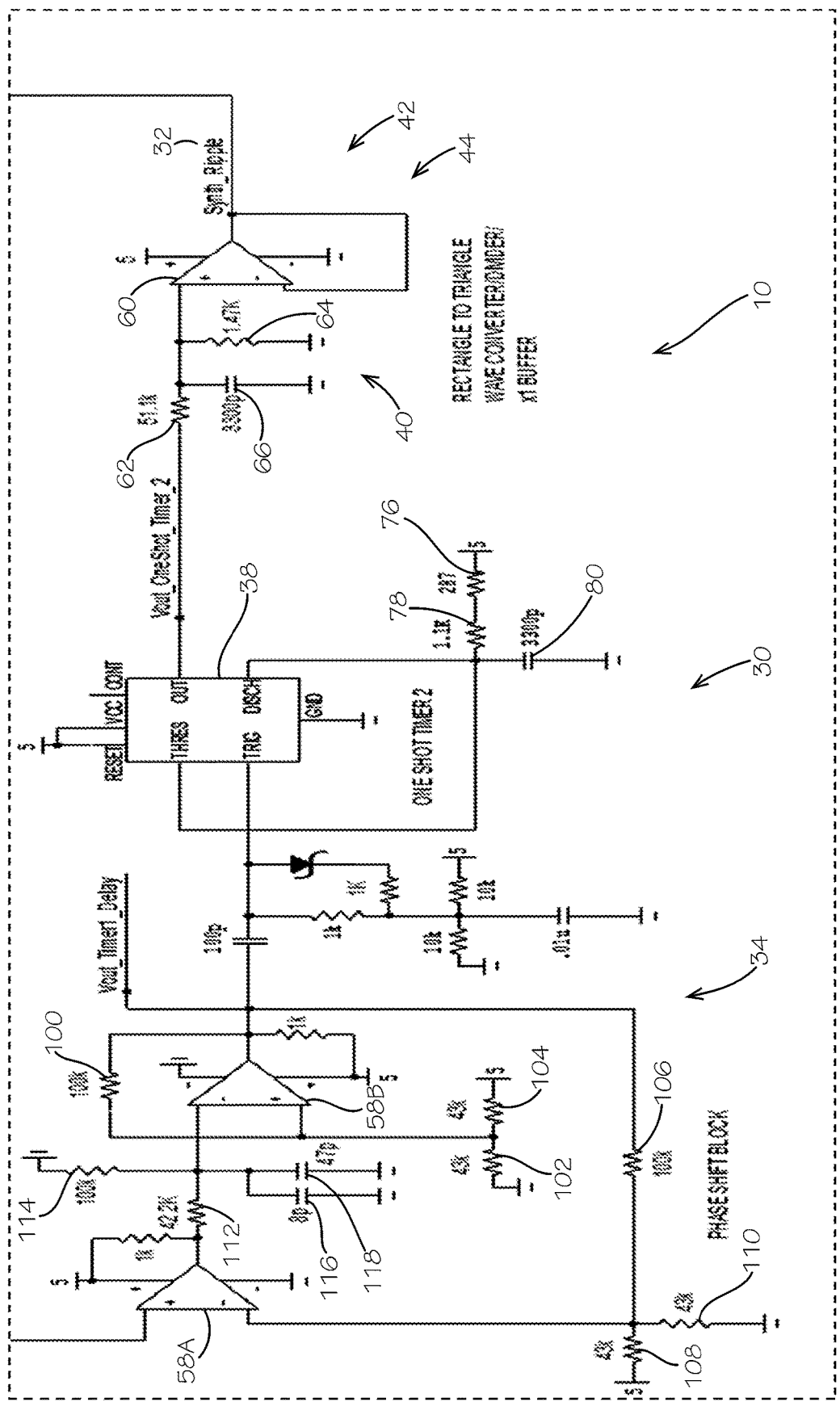
FIG. 4 is a detailed circuit diagram of a second portion of the circuit diagram of FIG. 2 including a synthesizing circuit.
Figure 5:
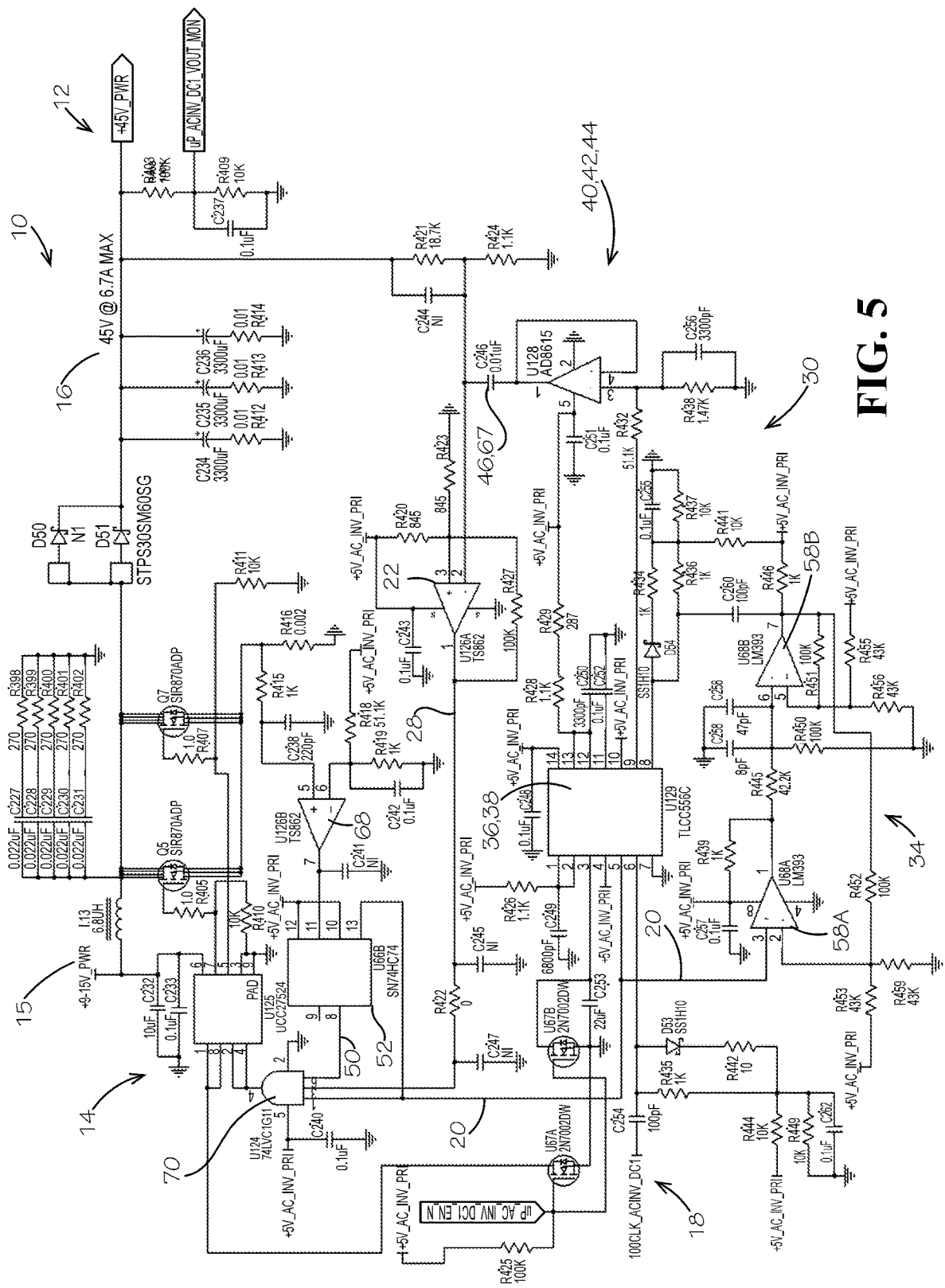
FIG. 5 is a circuit diagram of another embodiment of a practical application of a power controller 10 of the present disclosure.
Figure 6:
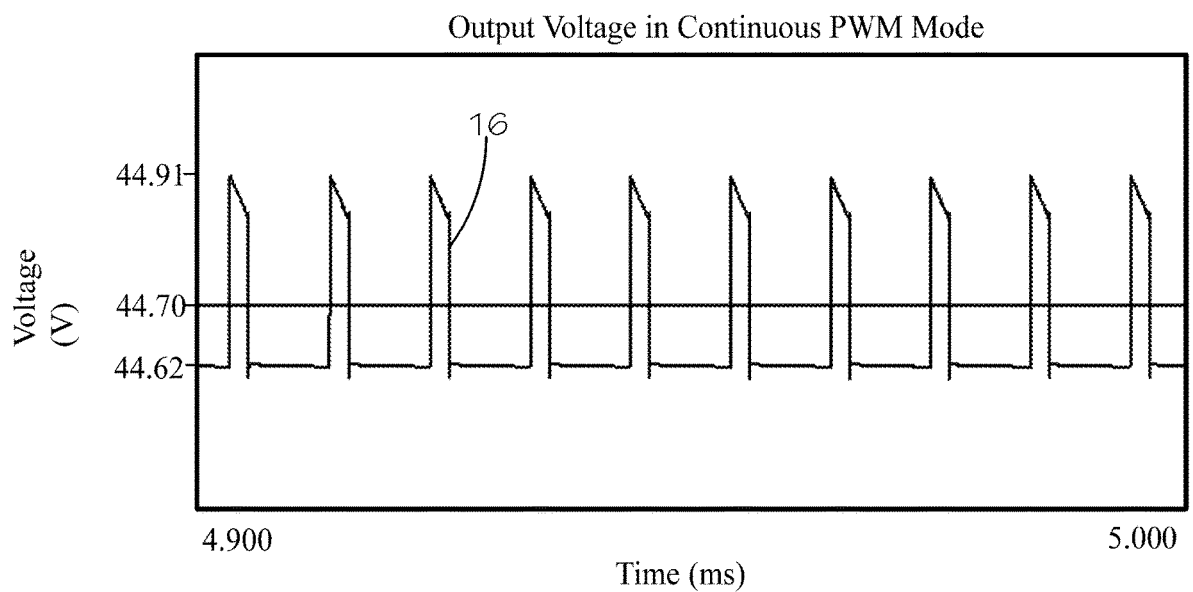
FIG. 6 is a plot diagram of an output voltage over time for the power controller of FIG. 2 operating in a continuous PWM mode.

A transient analysis was performed with sufficient time to allow the circuit to reach steady-state at full output power for power controller 10 shown in FIG. 2 and with the power stage voltage source set to 9V, which causes power controller 10 to operate in continuous PWM mode. Output voltage 16 over time is shown in FIG. 6 and shows average output voltage 16 amplitude of around 44.70V, with output voltage 16 having a peak to peak variation of about 0.29 mV during an "on" state of the power stage.

Figure 7:
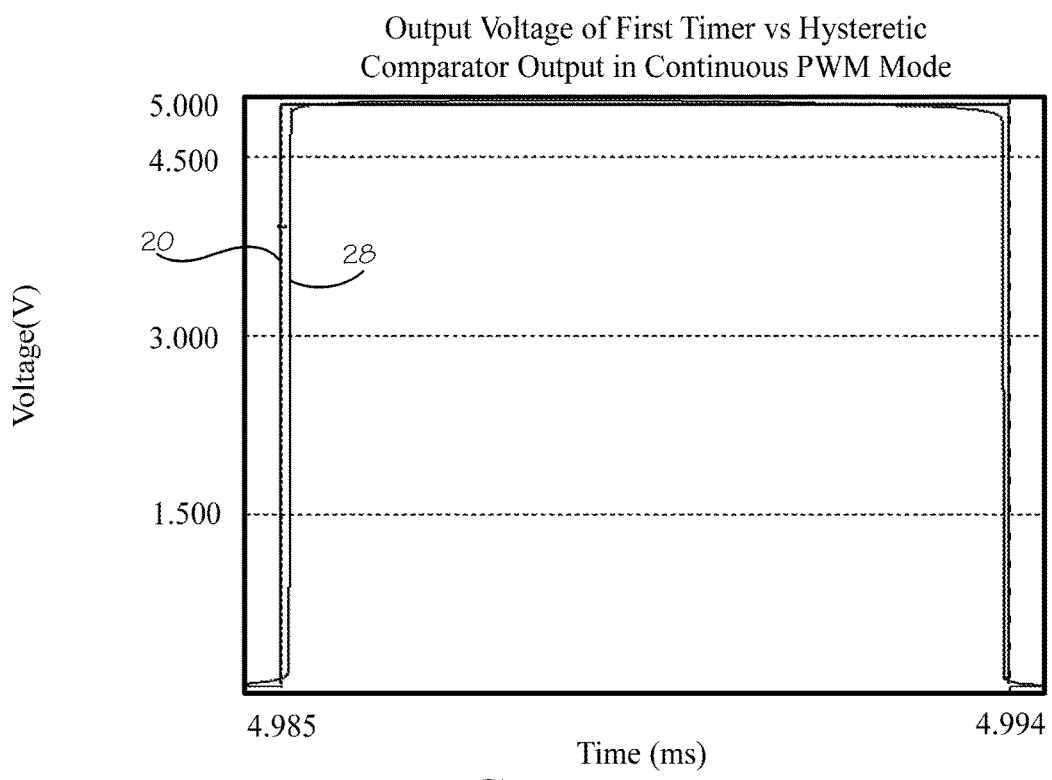
FIG. 7 is a plot diagram of an output voltage of a first timer versus a hysteretic comparator output over time for the power controller of FIG. 2 operating in a continuous PWM mode.

Output voltage of first timer versus hysteretic comparator output over time is shown in FIG. 7. FIG. 7 shows adequate synchronization between the first timer and the hysteretic comparator. The first timer output (or the input voltage) 20 is shown reaching a "logic one" status prior to hysteretic comparator output 28 reaching "logic one status," and hysteretic comparator output 28 returns to "logic zero" status prior to input voltage 20 reaching "logic zero" status. As such, the duty cycle of hysteretic comparator output 28 is contained within the duty cycle of input voltage 20 from the first timer, thus synchronizing hysteretic comparator output 28 with input voltage 20. The duty cycle is also approximately 80% since the time difference between the two cursors is approximately 8 uS, the period of first timer output or input voltage 20 being set at 10 uS.

Figure 8:
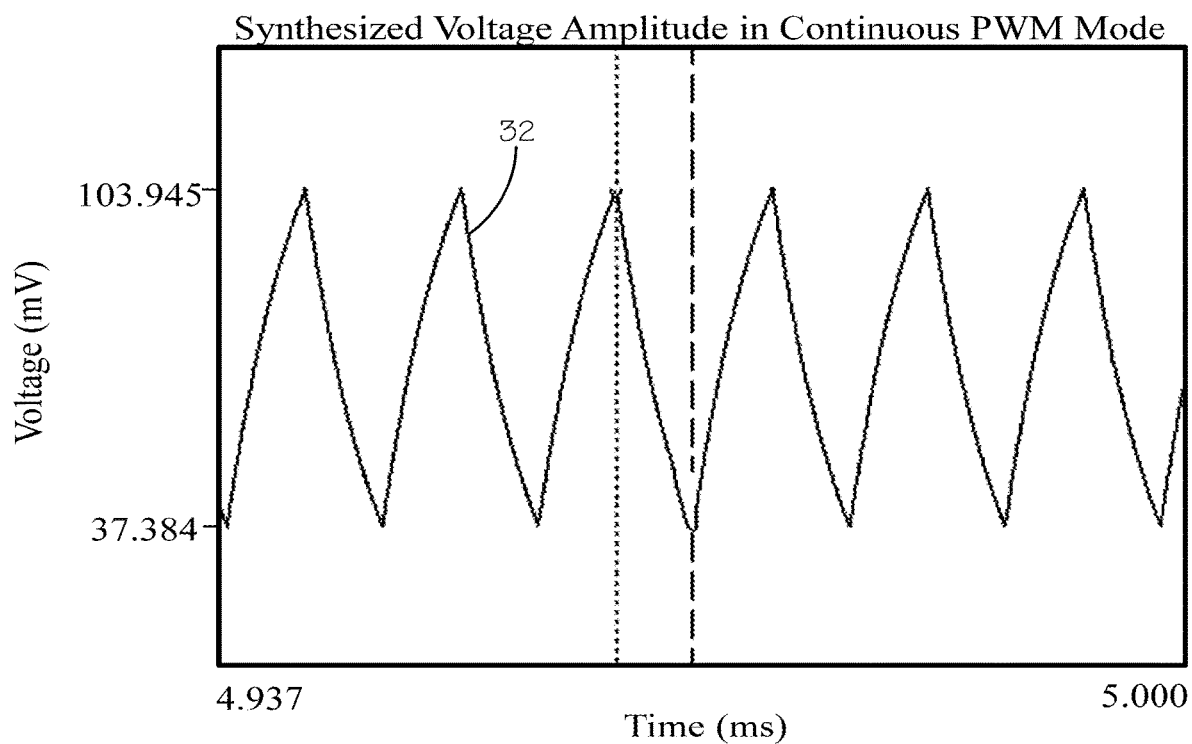
FIG. 8 is a plot diagram of a synthesized voltage generated by the power controller of FIG. 2 over time.

Synthesized voltage 32 amplitude vs time is shown in FIG. 8. FIG. 8 shows the synthesized voltage ripple 32 from the wave converter/voltage divider/buffer amplifier. The approximate peak to peak voltage is 66.56 mV with a fairly symmetrical triangular wave. This synthesized voltage 32 is AC coupled and applied to the negative terminal of the hysteretic comparator.

Figure 9:
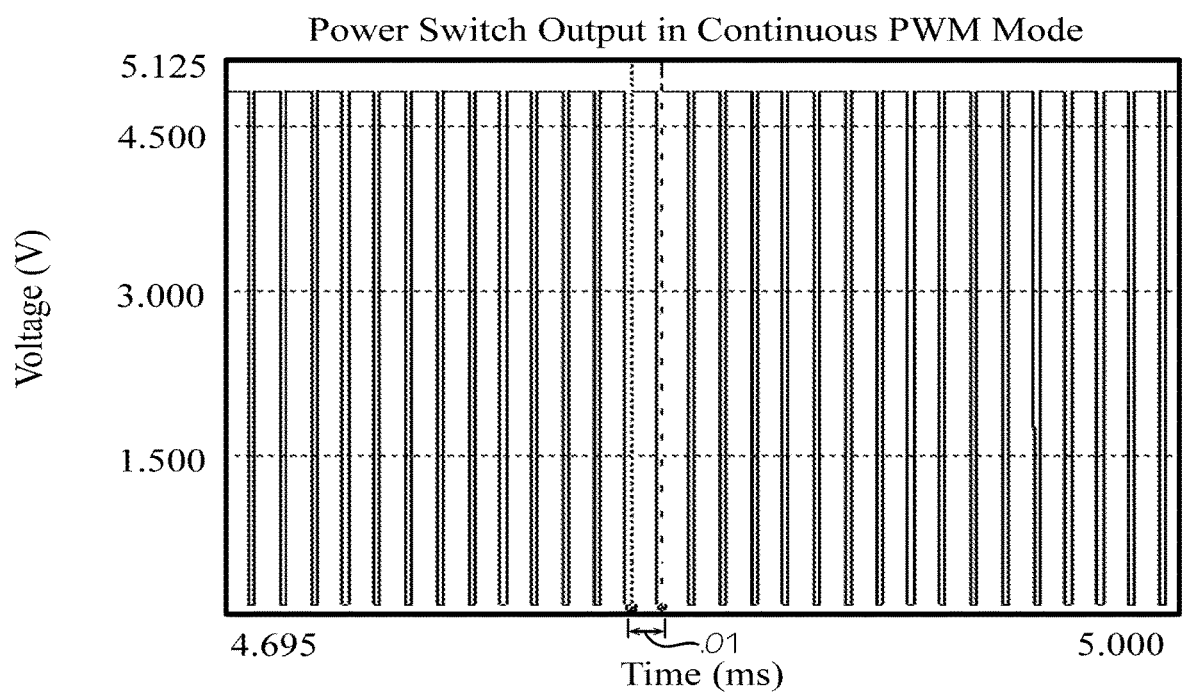
FIG. 9 is a plot diagram of a power switch voltage output over time for the power controller of FIG. 2 operating in a continuous PWM mode.

Power switch output over time is shown in FIG. 9. FIG. 9 shows the power switch output is a continuous fixed frequency with a period of 10 uS, which is the same as the system clock.

Figure 10:
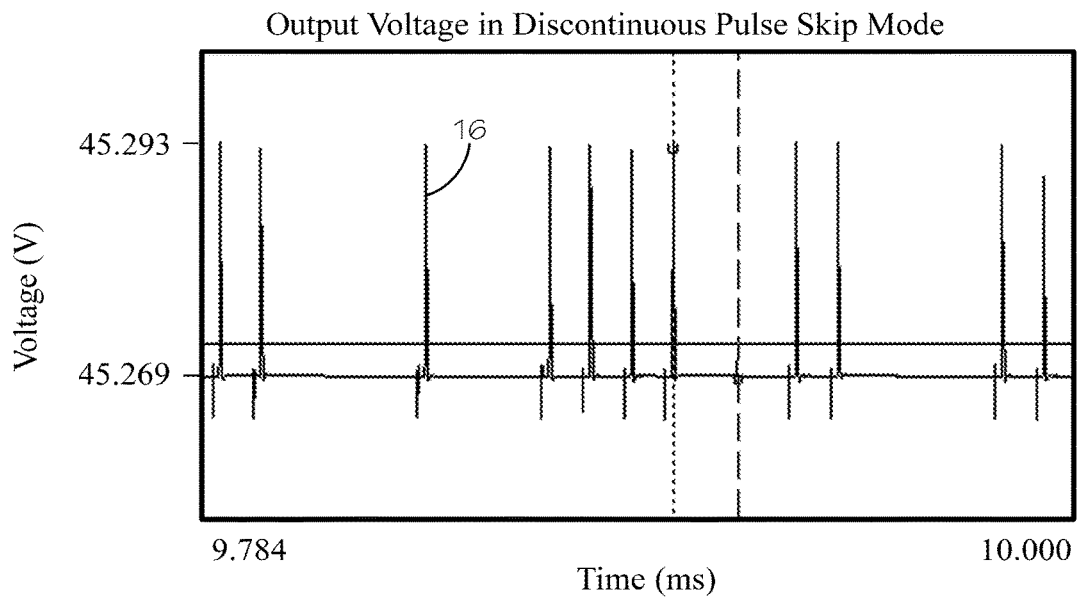
FIG. 10 is a plot diagram of an output voltage over time for the power controller of FIG. 2 operating in a discontinuous pulse skip mode.

A second transient analysis was run with sufficient time to allow the circuit to reach steady-state with a light load and the power stage voltage source set to 15V such that the power converter 10 of FIG. 2 operates in discontinuous pulse skip mode. Output voltage 16 over time for the second transient analysis in discontinuous pulse skip mode is shown in FIG. 10. Output voltage 16 operates at varying frequencies, has an average output voltage 16 of 45.27V, and a peak to peak voltage of approximately 24 mV when the power stage is periodically placed in an "on" state to recharge an output capacitor of the power stage.

Figure 11:
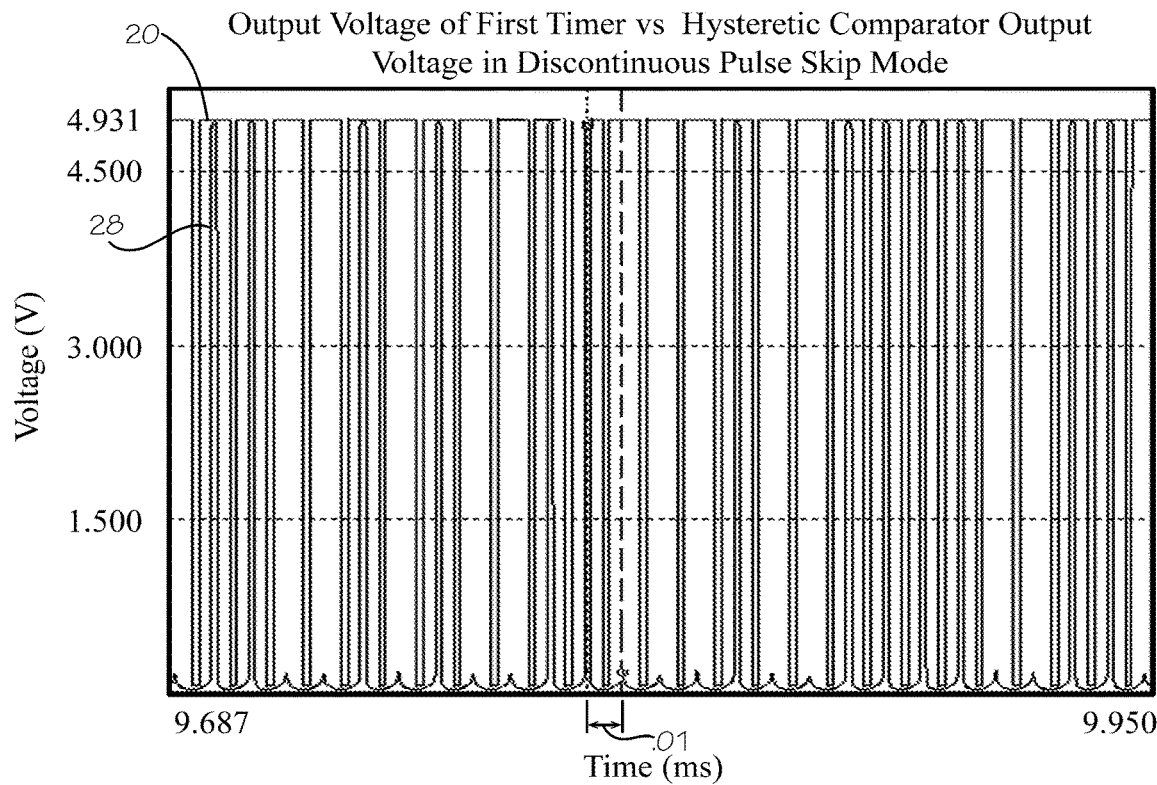
FIG. 11 is a plot diagram of an output voltage of a first timer versus a hysteretic comparator output over time for the power controller of FIG. 2 operating in a discontinuous pulse skip mode.

Output voltage of the first timer output or input voltage 20 versus hysteretic comparator output 28 over time for the second transient analysis is shown in FIG. 11. FIG. 11 shows that first timer output or input voltage 20 is at 80% duty cycle with a fixed period of 10 uS. However, hysteretic comparator output 28 only triggers or reaches a "logic one"

status at certain intervals in order to recharge the slight loss of charge in the output capacitor of the power stage. Hysteretic comparator output 28 still triggers within the boundary limits of the duty cycle set by the first timer or input voltage 20. Thus the power converter maintains adequate synchronization between hysteretic comparator output 28 and input voltage 20 even when operating in pulse skip mode.

Figure 12:
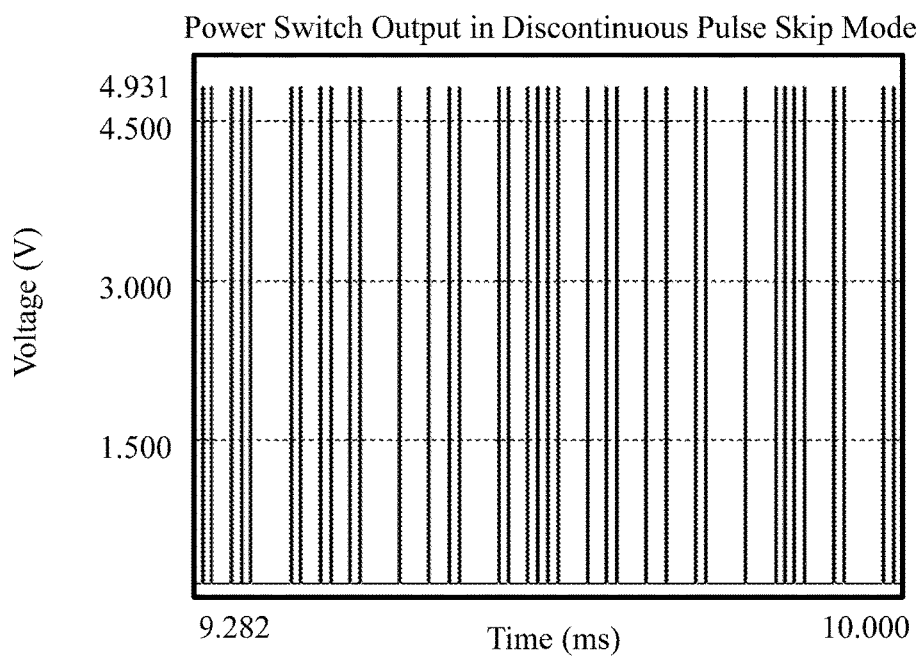
FIG. 12 is a plot diagram of a power switch voltage output over time for the power controller of FIG. 2 operating in a discontinuous pulse skip mode.

FIG. 12 shows the resulting power switch output in pulse skip mode. The power switch output is clearly not continuous with a fixed period of 10 uS, but rather momentarily triggers on the power switch to restore the lost charge in the output capacitor and maintain the output voltage at the desired regulated value.

Figure 13:
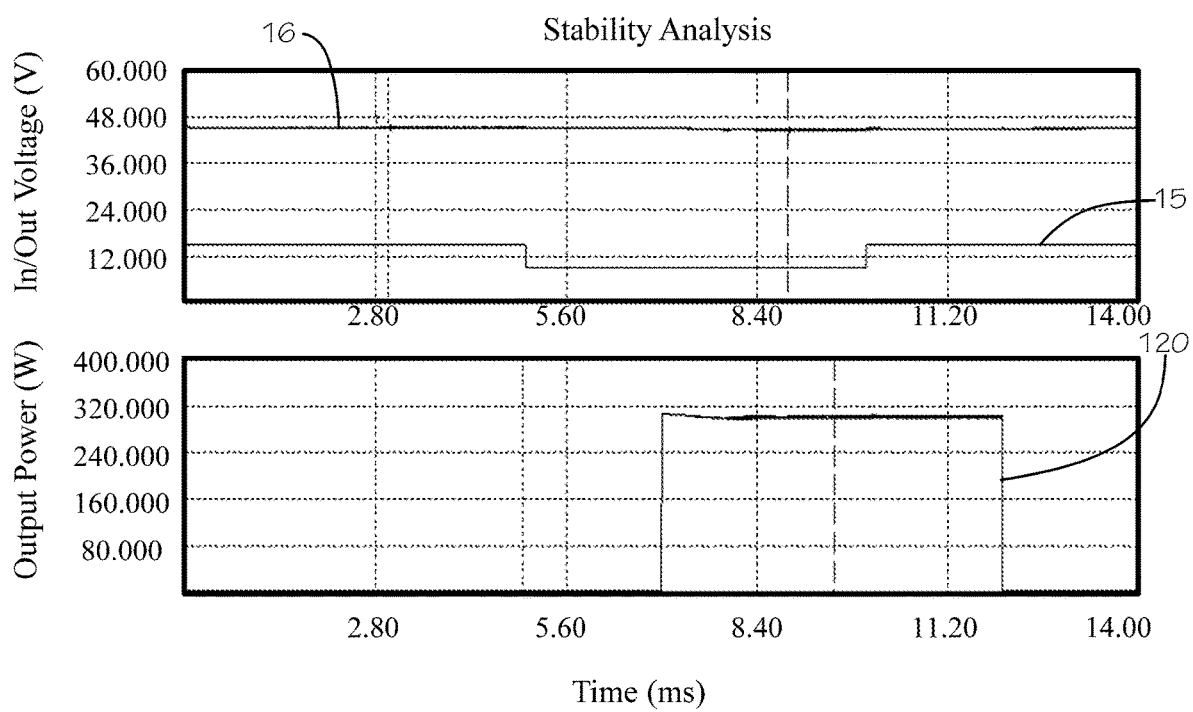
FIG. 13 is a plot diagram of an input voltages, output voltages, and output power over time showing the transient response of the power controller of FIG. 2.

A third transient analysis was run to demonstrate the transient response of power converter 10 and is shown in FIG. 13. This analysis varies the voltage source of the power stage from 9V to 15V in a step and also varies the load from 2 W to 300 W in a step and looks at any change in output voltage 16 during these transitions. The relative stability of the power converter is shown in FIG. 13. The upper graph plots output voltage 16 (top line) and power stage voltage source 15 voltage (bottom line). The bottom graph plots output power 120. The analysis begins with power stage voltage source 15 set at 15V and power output 120 at 2 W. At 5 mS, power stage voltage source 15 steps to 9V while output power 120 remains at 2 W. Output voltage 16 did not show any change or transient behavior. At 7 mS, output power 120 steps to 300 W while power stage voltage source 15 remains at 9V. This time output voltage 16 decreased slightly without any significant transient behavior. At 12 mS, output power 120 steps back to 2 W while power stage voltage source 15 is set to 15V. Output voltage 16 increased slightly without any significant transient behavior. Thus, power converter 10 of FIG. 2 demonstrates good output voltage stability across various transients.

Another aspect of the present disclosure includes a method of controlling power supply to an electrical load 12 concluding the steps of providing a power stage 14 operable to provide an output voltage 16 to load 12; supplying an input voltage 20 to power stage 14; comparing a reference voltage 24 to a feedback output voltage 26 from load 12 with a hysteretic comparator 22, feedback output voltage 26 being at least a portion of output voltage 16; providing a hysteretic comparator output 28 to power stage 14 from hysteretic comparator 22 to control output voltage 16 provided by power stage 14 based on the comparison between reference voltage 24 and feedback output voltage 26; and coupling a synthesized voltage 32 with feedback output voltage 26 before feedback output voltage 26 is compared with reference voltage 24 by hysteretic comparator 22, wherein synthesized voltage 32 is configured such that the coupling of synthesized voltage 32 with feedback output voltage 26 synchronizes hysteretic comparator output 28 with input voltage 20 provided to power stage 14.

In some embodiments, the method further includes generating synthesized voltage 32 with a synthesizing circuit 30, synthesizing circuit 30 configured to receive and manipulate input voltage 20 to generate synthesized voltage 32. In some embodiments, input voltage 20 comprises a rectangular waveform, and generating synthesized voltage 32 includes converting the rectangular waveform of input voltage 20 to a symmetric triangular waveform, and phase shifting input voltage 20. In some embodiments synthesizing circuit 30 includes an AC coupler 46, and coupling synthesized voltage 32 with feedback output voltage 26 includes AC coupling synthesized voltage 32 with feedback output voltage 26 via AC coupler 46. In some embodiments, input voltage 20 supplied to power stage 14 has a first duty cycle, and generating synthesized voltage 32 comprises reducing the duty cycle of input voltage via a second timer 38 of synthesizing circuit 30 to generate synthesized voltage 32 having a duty cycle that is less than the first duty cycle of input voltage 20.

In some embodiments, power stage 14 includes an AND function power switch 70 configured to receive input voltage 20 and hysteretic comparator output 28, and power stage 14 is configured via the AND function power switch 70 to provide output voltage 16 to load 12 when input voltage 20 and hysteretic comparator output 28 both reach a logic one status at the AND function power switch 70.

The design of a new hysteretic-based power controller 10 with synthesized voltage synchronization has been presented. Hysteretic-based power controller 10 provides a hysteretic controller with a fixed or controlled switching frequency. The power controller 10 in some embodiments can provide slow start up functionality, cycle by cycle current limit functionality, fixed frequency PWM mode, and discontinuous pulse skip mode, with the ability to continuously transition between the two modes. Power controller 10 can provide stability and response speed without the need for cumbersome compensation components associated with voltage mode controllers. Power controller 10 is applicable for integrated circuit fabrication and can help provide a simple, inexpensive solution for various power applications.

Thus, although there have been described particular embodiments of the present invention of a new and useful HYSTERETIC-BASED CONTROLLER SYNCHRONIZED BY A SYNTHESIZED VOLTAGE, it is not intended that such references be construed as limitations upon the scope of this invention.

What is claimed is:

1. A power controller for a load, the power controller comprising:

a power stage operable to selectively provide an output voltage to the load;

an input voltage generator operable to supply an input voltage to the power stage;

a hysteretic comparator operable to compare a reference voltage to a feedback output voltage from the load, the feedback output voltage being at least a portion of the output voltage, and provide a hysteretic comparator output to the power stage which controls the output voltage provided by the power stage based on the comparison between the reference voltage and the feedback output voltage; and a synthesizing circuit operable to generate a synthesized voltage and couple the synthesized voltage with the feedback output voltage before the feedback output voltage is compared with the reference voltage by the hysteretic comparator, wherein the synthesized voltage is configured such that the coupling of the synthesized voltage with the feedback output voltage synchronizes the hysteretic comparator output with the input voltage provided to the power stage, wherein the input voltage generator is operable to also supply the input voltage to the synthesizing circuit, and the synthesizing circuit is operable to manipulate the input voltage to generate the synthesized voltage, and wherein the input voltage comprises a rectangular waveform and the synthesizing circuit further comprises a wave converter operable to convert the rectangular waveform of the input voltage into a triangular waveform to generate the synthesized voltage.

2. The power controller of claim 1, wherein the triangular waveform generated by the wave converter for the synthesized voltage is a substantially symmetric triangular waveform.

3. A power controller for a load, the power controller comprising:
- a power stage operable to selectively provide an output voltage to the load;
- an input voltage generator operable to supply an input voltage to the power stage;
- a hysteretic comparator operable to compare a reference voltage to a feedback output voltage from the load, the feedback output voltage being at least a portion of the output voltage, and provide a hysteretic comparator output to the power stage which controls the output voltage provided by the power stage based on the comparison between the reference voltage and the feedback output voltage; and
- a synthesizing circuit operable to generate a synthesized voltage and couple the synthesized voltage with the feedback output voltage before the feedback output voltage is compared with the reference voltage by the hysteretic comparator, wherein the synthesized voltage is configured such that the coupling of the synthesized voltage with the feedback output voltage synchronizes the hysteretic comparator output with the input voltage provided to the power stage,
- wherein the input voltage generator is operable to also supply the input voltage to the synthesizing circuit, and the synthesizing circuit is operable to manipulate the input voltage to generate the synthesized voltage, and
- wherein the synthesizing circuit further comprises phase shift circuitry operable to produce a phase shift in the input voltage to generate the synthesized voltage.

4. A power controller for a load, the power controller comprising:
- a power stage operable to selectively provide an output voltage to the load;
- an input voltage generator operable to supply an input voltage to the power stage;
- a hysteretic comparator operable to compare a reference voltage to a feedback output voltage from the load, the feedback output voltage being at least a portion of the output voltage, and provide a hysteretic comparator output to the power stage which controls the output voltage provided by the power stage based on the comparison between the reference voltage and the feedback output voltage; and
- a synthesizing circuit operable to generate a synthesized voltage and couple the synthesized voltage with the feedback output voltage before the feedback output voltage is compared with the reference voltage by the hysteretic comparator, wherein the synthesized voltage is configured such that the coupling of the synthesized voltage with the feedback output voltage synchronizes the hysteretic comparator output with the input voltage provided to the power stage,
- wherein the input voltage generator is operable to also supply the input voltage to the synthesizing circuit, and the synthesizing circuit is operable to manipulate the input voltage to generate the synthesized voltage,
- wherein the power controller further comprises a first timer driven by the input voltage generator to produce the input voltage, the input voltage having a first duty cycle, and
- wherein the synthesizing circuit further comprises a second timer operable to maintain a second duty cycle for the synthesized voltage, the first duty cycle being different than the second duty cycle.

5. The power controller of claim 4, wherein the second timer is operable to maintain the second duty cycle of the synthesized voltage at approximately 50 percent.

6. A power controller for a load, the power controller comprising:
- a power stage operable to selectively provide an output voltage to the load;
- an input voltage generator operable to supply an input voltage to the power stage;
- a hysteretic comparator operable to compare a reference voltage to a feedback output voltage from the load, the feedback output voltage being at least a portion of the output voltage, and provide a hysteretic comparator output to the power stage which controls the output voltage provided by the power stage based on the comparison between the reference voltage and the feedback output voltage; and
- a synthesizing circuit operable to generate a synthesized voltage and couple the synthesized voltage with the feedback output voltage before the feedback output voltage is compared with the reference voltage by the hysteretic comparator, wherein the synthesized voltage is configured such that the coupling of the synthesized voltage with the feedback output voltage synchronizes the hysteretic comparator output with the input voltage provided to the power stage,
- wherein synchronizing the hysteretic comparator output and the input voltage provided to the power stage further comprises:
- the input voltage reaching a logic one status at the power stage in a given period of the input voltage before the hysteretic comparator output reaches a logic one status at the power stage; and
- the hysteretic comparator subsequently reaching a logic zero status at the power stage in the given period of the input voltage before the input voltage subsequently reaches a logic zero status at the power stage.

7. A power controller for a load, the power controller comprising:
- a power stage operable to selectively provide an output voltage to the load;
- an input voltage generator operable to supply an input voltage to the power stage;
- a hysteretic comparator operable to compare a reference voltage to a feedback output voltage from the load, the feedback output voltage being at least a portion of the output voltage, and provide a hysteretic comparator output to the power stage which controls the output voltage provided by the power stage based on the comparison between the reference voltage and the feedback output voltage; and
- a synthesizing circuit operable to generate a synthesized voltage and couple the synthesized voltage with the feedback output voltage before the feedback output voltage is compared with the reference voltage by the hysteretic comparator, wherein the synthesized voltage is configured such that the coupling of the synthesized voltage with the feedback output voltage synchronizes the hysteretic comparator output with the input voltage provided to the power stage, wherein the power controller can alternate between a continuous pulse width modulation mode and a discontinuous pulse skip mode;
- an output capacitor configured to receive the output voltage, wherein when the power controller is operating in the discontinuous pulse skip mode, the hysteretic comparator is configured to:
set the hysteretic comparator output to logic zero in response to sensing that the output capacitor is becoming fully charged before a subsequent cycle of the output voltage begins; and
set the hysteretic comparator hysteretic controller output to logic one to recharge the output capacitor via the power stage in response to sensing that the output capacitor is not becoming fully charged before a subsequent cycle of the output voltage begins.

8. A power controller for a load, the power controller comprising:
a power stage operable to selectively provide an output voltage to the load;
an input voltage generator operable to supply an input voltage to the power stage;
a hysteretic comparator operable to compare a reference voltage to a feedback output voltage from the load, the feedback output voltage being at least a portion of the output voltage, and provide a hysteretic comparator output to the power stage which controls the output voltage provided by the power stage based on the comparison between the reference voltage and the feedback output voltage; and
a synthesizing circuit operable to receive the input voltage, phase shift the input voltage, and convert the input voltage into a triangular waveform to produce a synthesized voltage, the synthesizing circuit operable to couple the synthesized voltage with the feedback output voltage before the feedback output voltage is compared with the reference voltage by the hysteretic comparator, wherein the synthesized voltage is configured such that the coupling of the synthesized voltage with the feedback output voltage synchronizes the hysteretic comparator output with the input voltage provided to the power stage.

9. A method of controlling power supply to an electrical load comprising steps of:
providing a power stage operable to provide an output voltage to the electrical load;
supplying an input voltage to the power stage;
comparing a reference voltage to a feedback output voltage from the electrical load with a hysteretic comparator, the feedback output voltage being at least a portion of the output voltage;
providing a hysteretic comparator output to the power stage from the hysteretic comparator to control the output voltage provided by the power stage based on the comparison between the reference voltage and the feedback output voltage; and
coupling a synthesized voltage with the feedback output voltage before the feedback output voltage is compared with the reference voltage by the hysteretic comparator, wherein the synthesized voltage is configured such that the coupling of the synthesized voltage with the feedback output voltage synchronizes the hysteretic comparator output with the input voltage provided to the power stage;
generating the synthesized voltage with a synthesizing circuit, the synthesizing circuit configured to receive and manipulate the input voltage to generate the synthesized voltage,
wherein the input voltage comprises a rectangular waveform, and generating the synthesized voltage includes converting the rectangular waveform of the input voltage to a symmetric triangular waveform, and phase shifting the input voltage.

10. A method of controlling power supply to an electrical load comprising steps of:
providing a power stage operable to provide an output voltage to the electrical load;
supplying an input voltage to the power stage;
comparing a reference voltage to a feedback output voltage from the electrical load with a hysteretic comparator, the feedback output voltage being at least a portion of the output voltage;
providing a hysteretic comparator output to the power stage from the hysteretic comparator to control the output voltage provided by the power stage based on the comparison between the reference voltage and the feedback output voltage; and
coupling a synthesized voltage with the feedback output voltage before the feedback output voltage is compared with the reference voltage by the hysteretic comparator, wherein the synthesized voltage is configured such that the coupling of the synthesized voltage with the feedback output voltage synchronizes the hysteretic comparator output with the input voltage provided to the power stage;
generating the synthesized voltage with a synthesizing circuit, the synthesizing circuit configured to receive and manipulate the input voltage to generate the synthesized voltage,
wherein the synthesizing circuit includes an AC coupler, and coupling the synthesized voltage with the feedback output voltage comprises AC coupling the synthesized voltage with the feedback output voltage via the AC coupler.

11. A method of controlling power supply to an electrical load comprising steps of:
providing a power stage operable to provide an output voltage to the electrical load;
supplying an input voltage to the power stage;
comparing a reference voltage to a feedback output voltage from the electrical load with a hysteretic comparator, the feedback output voltage being at least a portion of the output voltage;
providing a hysteretic comparator output to the power stage from the hysteretic comparator to control the output voltage provided by the power stage based on the comparison between the reference voltage and the feedback output voltage; and
coupling a synthesized voltage with the feedback output voltage before the feedback output voltage is compared with the reference voltage by the hysteretic comparator, wherein the synthesized voltage is configured such that the coupling of the synthesized voltage with the feedback output voltage synchronizes the hysteretic comparator output with the input voltage provided to the power stage,
wherein the power stage includes an AND function power switch configured to receive the input voltage and the hysteretic comparator output, and the power stage is operable via the AND function power switch to provide the output voltage to the load when the input voltage and the hysteretic comparator output both reach a logic one status at the AND function power switch.

* * * * *